United States Patent
Neufeld

(10) Patent No.: US 11,885,782 B2
(45) Date of Patent: Jan. 30, 2024

(54) METHOD OF DETERMINING AN AMOUNT OF WATER IN A SAMPLE USING A SULFONIC ACID

(71) Applicant: HONEYWELL INTERNATIONAL INC., Charlotte, NC (US)

(72) Inventor: Roman Neufeld, Seelze (DE)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 215 days.

(21) Appl. No.: 17/451,875

(22) Filed: Oct. 22, 2021

(65) Prior Publication Data

US 2022/0137015 A1 May 5, 2022

Related U.S. Application Data

(60) Provisional application No. 63/107,233, filed on Oct. 29, 2020.

(51) Int. Cl.
*G01N 31/16* (2006.01)

(52) U.S. Cl.
CPC .................................. *G01N 31/168* (2013.01)

(58) Field of Classification Search
CPC .................. G01N 31/16; G01N 31/168; Y10T 436/145555; Y10T 436/147777; Y10T 436/156666; Y10T 436/17; Y10T 436/173845; Y10T 436/18; Y10T 436/186
USPC ....... 436/39, 42, 96, 98, 102, 106, 111, 119, 436/122, 163
See application file for complete search history.

(56) References Cited

U.S. PATENT DOCUMENTS

| | | | | |
|---|---|---|---|---|
| 4,351,744 | A * | 9/1982 | Muroi | G01N 31/168 436/42 |
| 5,139,955 | A * | 8/1992 | Scholz | G01N 31/168 436/42 |
| 5,401,662 | A * | 3/1995 | Matschiner | G01N 31/168 436/112 |
| 11,714,072 | B2 * | 8/2023 | Seekamp | C01B 17/48 436/42 |
| 2002/0127726 | A1 | 9/2002 | Hoffmann et al. | |
| 2005/0202562 | A1 | 9/2005 | Girdler et al. | |
| 2020/0033307 | A1 * | 1/2020 | Neufeld | C07D 233/58 |

FOREIGN PATENT DOCUMENTS

| | | |
|---|---|---|
| KR | 101425997 B1 | 8/2014 |
| WO | 0072003 A1 | 11/2000 |
| WO | 2020023769 A1 | 1/2020 |

OTHER PUBLICATIONS

International Searching Authority, International Search Report and Written Opinion for Application No. PCT/US2021/072075 dated Feb. 23, 2022.

* cited by examiner

*Primary Examiner* — Maureen Wallenhorst
(74) *Attorney, Agent, or Firm* — LORENZ & KOPF, LLP

(57) ABSTRACT

A first method for determining an amount of water in a sample includes the step of providing a reagent including: sulfur dioxide or a derivative thereof; a base; an optional hydrogen halide or hydrogen halide donor; a solvent; and a sulfonic acid; and the step of titrating the sample with the reagent. A second method for determining an amount of water in a sample includes the step of providing the aforementioned reagent, combining the sample with the reagent; and adding a source of iodine to the sample and/or the reagent. The reagent may alternatively consist essentially of sulfur dioxide or a derivative thereof; imidazole and/or a derivative thereof; an optional hydrogen halide or hydrogen halide donor; acetonitrile; methane sulfonic acid; and methanol and/or ethanol.

20 Claims, No Drawings

METHOD OF DETERMINING AN AMOUNT OF WATER IN A SAMPLE USING A SULFONIC ACID

CROSS-REFERENCE TO RELATED APPLICATIONS

This application claims the benefit of U.S. Provisional Application No. 63/107,233 filed Oct. 29, 2020, which is incorporated by reference herein in its entirety.

TECHNICAL FIELD

The present disclosure generally relates to a method of determining an amount of water in a sample using a sulfonic acid. The present disclosure more specifically relates to use of sulfur dioxide or a derivative thereof, a base, a solvent, and one or more types of sulfonic acids.

BACKGROUND

The determination of water according to the Karl Fischer method, i.e., via Karl Fischer titration, utilizes the following reactions, whereby the stoichiometry between iodine and water is 1:1:
In an alcoholic or protic solution:

$$SO_2 + ROH + B \rightarrow BHSO_3R; \quad (1)$$

$$BHSO_3R + I_2 + H_2O + 2B \rightarrow BHSO_4R + 2BHI; \quad (2)$$

In a non-alcoholic or aprotic solution:

$$SO_2 + I_2 + H_2O + 3B \rightarrow BSO_3 + 2BHI; \quad (3)$$

Unwanted side reactions like the Bunsen reaction (4) and the hydrolysis reaction of $SO_3$ (5), lead to a deviation of the required 1:1 stoichiometry which results in too low water findings with an overall stoichiometry between iodine and water of 1:n, where n=1-2.

$$2H_2O + SO_2 + I_2 \rightarrow H_2SO_4 + 2HI \quad (4)$$

$$SO_3 + H_2O + 2B \rightarrow BHSO_4 + BH \quad (5)$$

wherein B is a base and ROH is an alcohol. This titration is carried out in two basic forms, namely as a volumetric titration and as a coulometric titration.

In the classic Karl Fischer titration, a reagent includes an alkyl sulfite, which is oxidized to form an alkyl sulfate in the presence of water. Karl Fischer titrations are typically carried out in an alcoholic solution (such as methanol). The use of an extend of alcohols help to stabilize the stoichiometry of the Karl Fischer reaction by moving the equilibrium to reaction (1) and (2). However, unwanted side reaction (4) and (5) can still occur.

The use of reagents which include an excess of pyridine to stabilize the stoichiometry has been described in literature. However, in such systems, the determinable water equivalent is heavily dependent on experimental conditions. For example, in such systems, a pyridine-$SO_3$ adduct forms, which takes part in a water-consuming side reaction (5) that can falsify the titration results.

Moreover, a difficulty in using non-alcoholic (aprotic) Karl-Fischer reagents is the change in stoichiometry. Depending on the aprotic solvent and base used, the iodine to water ratio in the Karl Fischer reaction is often 1:1-2 (instead of 1:1). If hydrolysis of the base-$SO_3$ adduct can be suppressed then the stoichiometry of $I_2:H_2O$ remains 1:1.

Accordingly, there remains an opportunity to develop a Karl-Fischer reagent with a stabilized 1:1 stoichiometry which allows highly accurate titrations in alcoholic and in non-alcoholic solvents.

BRIEF SUMMARY

The instant disclosure describes embodiments that utilize sulfonic acids to stabilize the Karl Fischer reaction stoichiometry ($I_2:H_2O$, 1:1), in both protic and aprotic solvents. In other words, unwanted side reactions such as (4) and (5) described above can be better suppressed by adding sulfonic acid to the Karl Fischer reagent.

This disclosure provides a first method for determining an amount of water in a sample includes the step of providing a reagent comprising: sulfur dioxide or a derivative thereof; a base; an optional hydrogen halide or a hydrogen halide donor; a solvent; and a sulfonic acid; and the step of titrating the sample with the reagent.

This disclosure also provides a second method for determining an amount of water in a sample. This method includes the step of providing the aforementioned reagent, combining the sample with the reagent; and adding a source of iodine to the sample and/or the reagent.

This disclosure further provides a reagent that may alternatively consist essentially of sulfur dioxide or a derivative thereof; imidazole and/or a derivative thereof; an optional hydrogen halide or an hydrogen halide donor; methane sulfonic acid; acetonitrile and/or methanol and/or ethanol and/or 1-methoxy-2-propanol and/or propylene glycol.

DETAILED DESCRIPTION

The following detailed description is merely exemplary in nature and is not intended to limit the method or reagent. Furthermore, there is no intention to be bound by any theory presented in the preceding background or the following detailed description.

Embodiments of the present disclosure are generally directed to methods of titration and solutions for the same. For the sake of brevity, conventional techniques may not be described in detail herein. Moreover, the various tasks and process steps described herein may be incorporated into a more comprehensive procedure or process having additional steps or functionality not described in detail herein. In particular, various steps in of titration are well-known and so, in the interest of brevity, many conventional steps will only be mentioned briefly herein or will be omitted entirely without providing the well-known process details. Various desirable features and characteristics of the present disclosure will become apparent from the subsequent detailed description of the disclosure and the appended claims, taken in conjunction with the accompanying drawings and the background of the disclosure.

This disclosure provides a method for determining an amount of water in a sample. Typically, this method can be described as a version or variant of the Karl Fisher Titration that is used to determine an amount of water or moisture in a sample. There are generally two methods used to perform the Karl Fischer titration. The first is known as a volumetric Karl Fischer titration. In this titration, the determination of the amount of water in the sample is based on an amount, or volume, of reagent used to convert the water. In this titration, samples are dissolved in a solvent before the titration begins. A reagent is added until the water is removed.

The second method is known as a coulometric Karl Fischer titration. In this titration, a reagent and solvent are combined in a titration cell. When a sample is introduced into the titration cell and dissolved, iodine is released by the induction of an electrical current. The amount of current required to convert the water is determinant of the amount of water in the sample. An advantage of the coulometric Karl Fischer titration is the capability to accurately measure small amounts of water, e.g. as low as 0.1 microgram (μg) of water. Each titration is described in greater detail below.

Referring now to the sample itself, the sample may be any sort of sample that includes water. The amount of water in the sample is not particularly limited and may be chosen by one of skill in the art. For example, in coulometric titrations, the amount of water in the sample is from about 0.1 to about 10000 μg of water, of from about 0.1 to about 3000 μg, of from about 20 to about 3000 μg of water, or of from about 1 to about 10000 μg of water. In volumetric titrations, the amount of water can greatly exceed 10000 μg. In still other embodiments, the maximum amount of water is determined by the size of the vessel used because of the amount of the reagent that would be required. The sample may be a liquid, gas, or solid provided that the sample includes an amount of water therein. The sample is typically a liquid that includes an amount of water therein. In various embodiments, the reagent of this disclosure is used with traditionally problematic samples that suffer from side reactions with traditional reagents such as solutions of ketones and/or aldehydes and unsaturated compounds such as vinylene carbonate.

The method includes the step of providing the reagent. The reagent may be alternatively described as a "Karl Fischer reagent." The reagent is used in titrating the sample that includes the amount of water therein. For example, the reagent can be used in either Karl Fischer method described above, e.g. volumetric or coulometric titrations. The regent may be described as a titrating solution, e.g. when used in coulometric titrations. In volumetric titrations, e.g. in one or two component reagents, the reagent of this disclosure may act as a solvent. Additionally, the mixture of iodine and the reagent may act as a one-component reagent.

The reagent can be free of an alcohol or may include an alcohol. Typically, the terminology "free of" describes embodiments that include less than 30, 20, 10, 9, 8, 7, 6, 5, 4, 3, 2, 1, 0.5, 0.1, 0.05, or 0.01, weight percent of alcohol based on a total weight of the reagent. In one embodiment, the reagent is completely free of alcohol (i.e., includes zero weight percent or an amount of alcohol that falls below typical detection limits). Alternatively, the reagent may include any alcohol including, but not limited to, methanol, ethanol, propanol, mono- and di-ethylene glycol monoalkyl ethers, and combinations thereof. In one embodiment, the reagent includes a solvent that includes or is an alcohol chosen from methanol, ethanol, propanol, 1-methoxypropan-2-ol, mono- and di-ethylene glycol monoalkyl ethers, and combinations thereof.

The reagent includes sulfur dioxide or a derivative thereof; a base; an optional hydrogen halide donor or hydrogen halide; a solvent; and a sulfonic acid; and the step of titrating the sample with the reagent. The reagent may be, consist essentially of, or consist of, the aforementioned compounds. The terminology "consisting essentially of" may describe embodiments that are free of compounds that are not hydrogen halide donors or hydrogen halides. The terminology "consisting essentially of" may alternatively describe embodiments that include, or are free of, one or more soluble halides that aren't the aforementioned hydrogen halide donor or a hydrohalide of a second derivative of imidazole described below. For example, the reagent may include, or be free of, one or more of sodium halide, or halides of organic cations, such as tetrabutylammonium iodide, imidazole hydrogen iodide or trimethylamine hydrogen iodide and/or dissociating organic salts such as, for example, tetrabutylammonium chloride, diethanolamine hydrogen bromide, guanidinium salts such as guanidinium benzoate, and/or combinations thereof. The reagent may include, or be free of, imidazole itself. The reagent may also include, or be free of, nitrogen bases such as salts or carboxylic acids, such as tetramethylammonium acetate, trimethylammonium acetate, tetrabutylammonium benzoate, lithium propionate acetic acid, propionic acid, butyric acid, benzoic acid, buffer substances such diethanolammonium benzoate or imidazolium acetate, or combinations thereof.

Throughout this description, it is contemplated that whenever the word "halide" is used, any halide may be used, i.e., fluorine, chlorine, bromine, iodine, or combinations thereof, in various non-limiting embodiments. Moreover, in other non-limiting embodiments, any time the word "iodide" is used, this may be substituted for fluoride, chloride, or bromide.

Sulfur Dioxide or Derivative Thereof:

Referring back, the reagent includes the sulfur dioxide ($SO_2$) or derivative thereof. The terminology "derivative thereof" describes compounds that act the same or substantially similarly to sulfur dioxide in the Karl-Fischer titration, as would be understood by one of skill in the art. For example, derivatives that may be used include, but are not limited to, reducing agents, sulfites such as dimethylsulfite, diethylsulfite, and combinations thereof.

In one additional embodiment, the sulfur dioxide or derivative thereof is present in an amount of from about 0.05 to about 5, mols/liter of the reagent. In other embodiments, the sulfur dioxide or derivative thereof is present in an amount of from about 0.05 to about 1, from about 0.1 to about 1, or from about 0.1 to about 0.5, mols/liter of the reagent. In various non-limiting embodiments, it is also contemplated that all values and ranges of values, both whole and fractional, between and including those values set forth above are expressly contemplated for use herein.

Base:

Referring now to the base, the base may by any base known in the art suitable for Karl-Fischer titration. For example, the base may be a nitrogen containing base or may be a base that is free of nitrogen. For example, the base may be a primary, secondary, or tertiary amine. In alternative embodiments, the base may be pyridine or a derivative thereof. In another embodiments, the base may be a primary amine. Alternatively, the base may be imidazole, a derivative of imidazole, or combinations thereof. The base, and the reagent itself, may include less than 10, 9, 8, 7, 6, 5, 4, 3, 2, 1, 0.5, or 0.1, weight percent of pyridine or may be totally free of pyridine.

In various embodiments, the reagent includes a molar ratio of the base to the sulfur dioxide or derivative thereof that is greater than, or less than, 1:1. In various embodiments, the molar ratio of the base to the sulfur dioxide or derivative thereof is about 1.5:1, about 2:1, about 2.5:1, about 3:1, about 3.5:1, about 4:1, about 4.5:1, about 5:1, about 5.5:1, about 6:1, about 6.5:1, about 7:1, about 7.5:1, about 8:1, about 8.5:1, about 9:1, about 9.5:1, about 10:1, about 10.5:1, about 11:1, about 11.5:1, about 12:1, about 12.5:1, about 13:1, about 13.5:1, about 14:1, about 14.5:1, about 15:1, about 15.5:1, about 16:1, about 16.5:1, about 17:1, about 17.5:1, about 18:1, about 18.5:1, about 19:1, about 19.5:1, or about 20:1. It is also contemplated that each of these molar ratios may be reversed thereby indicating that a molar ratio of the base to the sulfur dioxide or derivative thereof is less than 1:1. In various embodiments, if a liquid based is used, then the molar ratio can be much higher than 20:1, e.g. 30:1, 40:1, 50:1, or even higher. In one embodiment, the molar ratio of the base to the sulfur dioxide or derivative thereof is greater than 2:1. In another embodiment, the molar ratio of the base to the sulfur dioxide or derivative thereof is greater than 5:1. In a further embodiment, the molar ratio of the base to the sulfur dioxide or derivative thereof is about 14:1. Moreover, it is contemplated that the reagent may include amounts "greater than" any of the aforementioned ratios, e.g., "greater than" about 2:1, greater than about 2.5:1, etc. In other embodiments, the base is present in an amount of from about 0.5 to about 5.5, or about 0.5 to about 5, or about 0.5 to about 2.5, mols/liter of the reagent. In various non-limiting embodiments, it is also contemplated that all values and ranges of values, both whole and fractional, between and including those values set forth above are expressly contemplated for use herein.

Referring now to the derivative of imidazole, this derivative may be described as a "first derivative" of imidazole, especially when a "second" derivative is used, as described below. It is to be understood that the "derivative of imidazole" and the "first derivative of imidazole" may be used interchangeably throughout.

The first derivative of imidazole may have the following structure:

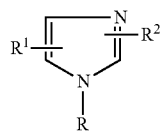

wherein each of R, $R^1$, and $R^2$ is independently a hydrogen atom, a phenyl group, a substituted phenyl group, a first hydrocarbyl group having from 1 to 6 carbon atoms, or a second hydrocarbyl group having 1 to 6 carbon atoms interrupted in at least one position with a heteroatom. In this structure, R, $R^1$, and $R^2$ cannot all be hydrogen atoms because then the structure would be imidazole itself. In various embodiments, the first hydrocarbyl group has 1, 2, 3, 4, 5, or 6 carbon atoms. The second hydrocarbyl group may also independently include 1, 2, 3, 4, 5, or 6 carbon atoms wherein at one or more points in the chain of the group, a heteroatom including, but not limited to, nitrogen, oxygen, phosphorous, chlorine, bromine, or iodine. Moreover, each of $R^1$ and $R^2$ may be located at any point on the ring. In one additional embodiment, each of R, $R^1$, and $R^2$ is independently a hydrogen atom or a methyl, ethyl, propyl, or butyl group, provided that R, $R^1$, and $R^2$ are not all hydrogen atoms.

In various embodiments, the first derivative of imidazole is present in the reagent in the amounts set forth above relative to the base and the sulfur dioxide or derivative thereof. In other embodiments, the first derivative of imidazole is present in an amount of from about 0.5 to about 5.5, or about 0.5 to about 5, or about 0.5 to about 2.5, mols/liter of the reagent. In other embodiments, the first derivative of imidazole is present in an amount that reflects one or more of the aforementioned molar ratios of the first derivative of imidazole to the sulfur dioxide or derivative thereof of greater than 1:1. For example, whatever the number of moles of the sulfur dioxide or derivative thereof is in the reagent, the first derivative of imidazole may be present in a number of moles that is greater than 1:1, e.g. in any of the ratios set forth above or when used in excess, e.g. as solvent. In various non-limiting embodiments, it is also contemplated that all values and ranges of values, both whole and fractional, between and including those values set forth above are expressly contemplated for use herein.

Hydrogen Halide Donor:

Referring now to the hydrogen halide donor, this donor may be a hydrogen halide of an amine. This amine may be any known in the art including imidazole such that the donor may be a hydrohalide of imidazole itself, e.g. a hydroiodide, hydrochloride, or hydrobromide. Moreover, this amine may be any described herein. In various embodiments, this amine is an optionally substituted aliphatic, cyclic, heterocyclic or aromatic amine such as pyridine and derivatives thereof, trialkylamine, such as trimethylamine, triethylamine, tri-n-butylamine, N,N-dimethylethylamine, N,N-diethylmethylamine, imidazole, N-ethylmorpholine, N-methylmorpholine, 2-morpholinoethanol, 1-methylpiperidine, 1-ethylpiperidine, 1-methylpyrrolidine, 2-(dimethylamino)-2-methyl-1-propanol, diethanol amine, pyridine and derivatives thereof, and combinations thereof. Accordingly, the hydrogen halide donor may be a hydrogen iodide/bromide/chloride of any of the above amines. The reagent may be free of any of the aforementioned hydrogen halide donors and instead utilize the hydrogen halide donor described immediately below.

In one embodiment, the hydrogen halide donor is a hydrohalide of a second derivative of imidazole, e.g. a hydroiodide of the second derivative of imidazole. In one embodiment, the hydrogen halide donor is a hydrobromide of a second derivative of imidazole. In another embodiment, the hydrogen halide donor is a hydrochloride of a second derivative of imidazole.

In one embodiment, the hydrogen halide donor is a hydroiodide or hydrobromide or hydrochloride, or a combination thereof, of a second derivative of imidazole, wherein the second derivative of imidazole can have the following structure:

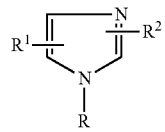

wherein each of R, $R^1$, and $R^2$ is independently a hydrogen atom, a phenyl group, a substituted phenyl group, a first hydrocarbyl group having from 1 to 6 carbon atoms, or a second hydrocarbyl group having 1 to 6 carbon atoms interrupted in at least one position with a heteroatom. In one structure, R, $R^1$, and $R^2$ cannot all be hydrogen atoms. In another embodiment, each of R, $R^1$, and $R^2$ is a hydrogen atom. In various embodiments, the first hydrocarbyl group has 1, 2, 3, 4, 5, or 6 carbon atoms. The second hydrocarbyl group may also independently include 1, 2, 3, 4, 5, or 6 carbon atoms wherein at one or more points in the chain of the group, a heteroatom including, but not limited to, nitrogen, oxygen, phosphorous, chlorine, bromine, or iodine. Moreover, each of $R^1$ and $R^2$ may be located at any point on the ring. Each of R, $R^1$, and $R^2$ may be different from the aforementioned R, $R^1$, and $R^2$ of the first derivative of imidazole. Alternatively, each of R, $R^1$, and $R^2$ may be described as $R^3$, $R^4$, and $R^5$, respectively. In one additional embodiment, each of R, $R^1$, and $R^2$ is independently a hydrogen atom or a methyl, ethyl, propyl, or butyl group, provided that R, $R^1$, and $R^2$ are not all hydrogen atoms.

The hydrohalide may be a hydroiodide, hydrochloride, or hydrobromide, or a combination thereof, of any of the aforementioned amines. In other words, the hydrohalide may be any compound of hydroiodic/bromic/chloric acid with any of the aforementioned amines or, e.g., any of the aforementioned embodiments of the second derivative of imidazole, as is appreciated by one of skill in the art. The second derivative of imidazole and the first derivative of imidazole may have the same general structure except that the second derivative of imidazole is a hydrohalide. In other words, the only difference between the first and second derivatives of imidazole may be that the first is not a hydrohalide and the second is a hydrohalide, even though the five membered ring structure and substituents may be the same or approximately the same.

The hydrogen halide donor may be any of the aforementioned compounds alone, may be the hydrohalide of the second derivative of imidazole alone, or may include a combination thereof. The hydrogen halide may be hydroiodide, hydrochloride, or hydrobromide, or a combination thereof without the amine donor.

The hydrogen halide donor or hydrogen halide may be present in any amount as chosen by one of skill in the art, e.g. in an amount of from about 0.01 to about 5, about 0.1 to about 2, about 0.2 to about 1.5, or from about 0.2 to about 1, mols/liter of the reagent. In various non-limiting embodiments, it is also contemplated that all values and ranges of values, both whole and fractional, between and including those values set forth above are expressly contemplated for use herein.

The reagent may also include a hydrogen halide acceptor. This acceptor may have a $pK_A$ of more than 5. This acceptor may be any known in the art including, but not limited to, an optionally substituted aliphatic, cyclic, heterocyclic or aromatic amines such as pyridine and derivatives thereof, trialkylamines, such as trimethylamine, triethylamine, tri-n-propylamine, tri-n-butylamine, N,N-dimethylethylamine, N,N-diethylmethylamine, N,N-dimethyl-n-butylamine, also N,N,N',N'-tetramethylethylenediamine, imidazole, 1-methylpiperidine, 1-ethylpiperidine, 1,2-dimethylpyrrolidine, 2-(dimethylamino)-2-methyl-1-propanol, 1-methylpyrrolidine, N-ethylmorpholine, N-methylmorpholine, 2-morpholinoethanol, and combinations thereof. In various embodiments, the hydrogen halide acceptor is chosen from 2-morpholinoethanol, 2-(dimethylamino)-2-methyl-1-propanol, diethanol amine, and combinations thereof. In various embodiments, the acceptor is used in amount of from 0.005 to 5 mols/liter of the reagent. In various non-limiting embodiments, it is also contemplated that all values and ranges of values, both whole and fractional, between and including those values set forth above are expressly contemplated for use herein.

Solvent:

Referring now to the solvent, the solvent may be any known in the art. The solvent may be, include, consist essentially of, or consist of, a protic solvent, an aprotic solvent, or combinations thereof. In one embodiment, the solvent may be, include, consist essentially of, or consist of, a protic solvent. In another embodiment, solvent may be, include, consist essentially of, or consist of, an aprotic solvent. In still another embodiment, the solvent may be, include, consist essentially of, or consist of, an alcohol, a nitrile solvent, or combinations thereof. In one embodiment, the solvent may be, include, consist essentially of, or consist of, the alcohol. In another embodiment, the solvent may be, include, consist essentially of, or consist of, the nitrile solvent. It is contemplated that the reagent may be free of, or include less than 10, 9, 8, 7, 6, 5, 4, 3, 2, 1, 0.5, or 0.1, weight percent of, one or more of an aprotic solvent, a protic solvent, an alcohol, or a nitrile solvent, based on a total weight of the reagent. The terminology "consisting essentially of" may describe one or more embodiments that are free of, or include less than 10, 9, 8, 7, 6, 5, 4, 3, 2, 1, 0.5, or 0.1, weight percent of, one or more of an aprotic solvent, a protic solvent, an alcohol, or a nitrile solvent, or any other solvent in the art, based on a total weight of the reagent. In various non-limiting embodiments, it is also contemplated that all values and ranges of values, both whole and fractional, between and including those values set forth above are expressly contemplated for use herein.

In one embodiment, the solvent may be, include, consist essentially of, or consist of, a solvent chosen from acetonitrile, propionitrile, and combinations thereof. In another embodiment, the solvent may be, include, consist essentially of, or consist of, acetonitrile. In a further embodiment, the solvent may be, include, consist essentially of, or consist of, an alcohol chosen from methanol, ethanol, propanol, 1-methoxypropan-2-ol, mono- and di-ethylene glycol monoalkyl ethers, and combinations thereof.

If the aprotic solvent is utilized, the aprotic solvent may be any known in the art including, but not limited to, ethers, such as diisopropyl ether, dibutyl ether, dioxane, tetrahydrofuran, diethylene glycol dimethyl ether, diethylene glycol diethylether, nitriles, such as acetonitrile, esters, such as ethyl acetate, ethyl propionate, isobutyl acetate, n-butyl acetate, ethylene carbonate, propylene carbonate, butyrolactone, halogenated hydrocarbons, such as chloroform, methylene chloride, carbon tetrachloride, bromoform, dibromomethane, 1,2-dichloropropane, acid amides, such as dimethylformamide, N-methylformamide, formamide, dimethylacetamide, 2-pyrrolidone, N-methylpyrrolidone, ketones, such as acetone, methyl ethyl ketone, diethyl ketone, cyclohexanone, methylcyclohexanone, ethylene carbonate, acetylacetone and other aprotic solvents, such as, for example, dimethylacetal. In one embodiment, the aprotic solvent is chosen from acetonitrile, propylene carbonate, ethyl acetate, tetrahydrofuran, dioxane, dimethylformamide or methylene chloride and combinations thereof. In a further embodiment, the aprotic solvent is chosen from cyclic and non-cyclic carbonates, ethers, esters, halo-hydrocarbons, acid amides, nitriles, ketones, glycol ethers, and combinations thereof. In another embodiment, the aprotic solvent is chosen from acetonitrile, ethylene carbonate, propylene carbonate, and combinations thereof. In another embodiment, the aprotic solvent is chosen from acetonitrile, propylene carbonate, and combinations thereof. In one embodiment, the aprotic solvent is acetonitrile. In another embodiment, the aprotic solvent is propylene carbonate. In another embodiment the aprotic solvent is dimethylformamide. In another embodiment aprotic solvent is chosen from dimethylformamide, acetonitrile and combinations thereof. In still other embodiments, the aprotic solvent may be pure (liquid) derivatives of imidazole, such as any described herein. It is contemplated that the reagent may be free of one or more of the aforementioned aprotic solvents or may include less than 5, 4, 3, 2, 1, 0.5, or 0.1, weight percent of one or more of the aforementioned aprotic solvents based on a total weight of the reagent. The aprotic solvent may be present in any amount as chosen by one of skill in the art and, for example, may be present in an amount to "balance" the aforementioned compounds so as to make the titrating composition have 100 total parts. In various non-limiting embodiments, it is also contemplated that all values and ranges of values, both whole and fractional, between and including those values set forth above are expressly contemplated for use herein.

If the protic solvent is used, the protic solvent may be any known in the art. For example, the protic solvent may be an alcohol such as methanol, ethanol, propanol, mono- and/or di-ethylene glycol monoalkylether having from 1, 2, 3, 4, 5, 6, 7, or 8 carbon atoms, or combinations thereof. The protic solvent may be used in any amount as described above relative to the aprotic solvent. In various non-limiting embodiments, it is also contemplated that all values and ranges of values, both whole and fractional, between and including those values set forth above are expressly contemplated for use herein.

The solvent may be utilized in any amount as determined by one of skill in the art. For example, it may be used in an amount to "balance" all other components of the reagent such that a total amount of all components of the reagent is 100 parts or 100 wt %. Alternatively, the solvent may be used in an amount of from about 1 to about 99, about 5 to about 95, about 10 to about 90, about 15 to about 85, about 20 to about 80, about 25 to about 75, about 30 to about 70, about 35 to about 65, about 40 to about 60, about 45 to about 55, about 50 to about 55, about 1, 2, 3, 4, 5, 6, 7, 8, 9, or 10, or about 90, 91, 92, 93, 94, 95, 96, 97, 98, or 99, weight percent, based on a total weight of the reagent. In various non-limiting embodiments, it is also contemplated that all values and ranges of values, both whole and fractional, between and including those values set forth above are expressly contemplated for use herein.

Sulfonic Acid:

The reagent also includes a sulfonic acid. The sulfonic acid may be any known in the art. Typically, the sulfonic acid is an alkyl sulfonic acid, an aryl sulfonic acid, or combinations thereof. For example, the alkyl sulfonic acid may include an alkyl group having from 1 to 8 carbon atoms, e.g. 1, 2, 3, 4, 5, 6, 7, or 8 carbon atoms. In various embodiments, the alkyl sulfonic acid is chosen from methane sulfonic acid, ethane sulfonic acid, and combinations thereof. In other embodiments, the aryl sulfonic acid is chosen from toluene sulfonic acid, alkyl benzene sulfonic acids, including but not limited to linear alkyl benzene sulfonic acid, and combinations thereof. In still other embodiments, the sulfonic acid is chosen from methane sulfonic acid, ethane sulfonic acid, toluene sulfonic acid, alkyl benzene sulfonic acids, and combinations thereof. In one embodiment, the sulfonic acid is methane sulfonic acid. In various non-limiting embodiments, it is also contemplated that all values and ranges of values, both whole and fractional, between and including those values set forth above are expressly contemplated for use herein.

In various embodiments, the sulfonic acid is present in an amount of from about 0.1 to about 80, about 0.1 to about 1, about 0.2 to about 0.9, about 0.3 to about 0.8, about 0.4 to about 0.7, about 0.5 to about 0.6, about 5 to about 75, about 10 to about 70, about 15 to about 65, about 20 to about 60, about 25 to about 55, about 30 to about 50, about 35 to about 45, about 40 to about 45, about 8 to about 15, or about 5, 6, 7, 8, 9, 10, 11, 12, 13, 14, or 15, weight percent based on a total weight of the reagent. In other embodiments, the sulfonic acid is present in an amount of from about 0.01 to about 20, about 0.01 to about 0.1, about 0.02 to about 0.09, about 0.03 to about 0.08, about 0.04 to about 0.07, about 0.05 to about 0.06, about 1 to about 20, about 2 to about 19, about 3 to about 18, about 4 to about 17, about 5 to about 16, about 6 to about 15, about 7 to about 14, about 8 to about 13, about 9 to about 12, about 10 to about 11, about 0.5 to about 1.5, or about 0.5, 0.6, 0.7, 0.8, 0.9, 1, 1.1, 1.2, 1.3, 1.4, or 1.5, mols per liter of reagent. In various non-limiting embodiments, it is also contemplated that all values and ranges of values, both whole and fractional, between and including those values set forth above are expressly contemplated for use herein.

In one additional embodiment, the sulfur dioxide or derivative thereof is present in an amount of from about 0.05 to about 1, mols/liter of the reagent, the base is present in an amount of from about 0.5 to about 2.5 or about 0.5 to about 5, mols/liter of the reagent, the hydrohalide donor or hydrogen halide is present in an amount of from about 0.01 to about 2, mols/liter of the reagent, and the sulfonic acid is present in an amount of from about 0.5 to about 1.5 mols/liter of the reagent. The solvent can comprise a balance of the reagent.

In another additional embodiment, the sulfur dioxide or derivative thereof is present in an amount of from about 0.10 to about 0.30, mols/liter of the reagent, the base is present in an amount of from about 0.5 to about 1, mols/liter of the reagent, the hydrohalide donor or hydrogen halide is present in an amount of from about 0.1 to about 1.5, mols/liter of the reagent, and the sulfonic acid is present in an amount of from about 0.5 to about 1.5 mols/liter of the reagent. The solvent can comprise a balance of the reagent.

In still a further embodiment, the sulfur dioxide or derivative thereof is present in an amount of about 0.2 mols/liter of the reagent, the first derivative of imidazole is present in an amount of about 1.4, mols/liter of the reagent wherein each of R, $R^1$, and $R^2$ is independently a hydrogen atom or a methyl, ethyl, propyl, or butyl group, provided that R, $R^1$, and $R^2$ are not all hydrogen atoms, the hydrohalide of the second derivative of imidazole is present in an amount of about 0.2, mols/liter of the reagent, wherein each of R, $R^1$, and $R^2$ is independently a hydrogen atom or a methyl, ethyl, propyl, or butyl group, provided that R, $R^1$, and $R^2$ are not all hydrogen atoms; and the sulfonic acid is present in an amount of from about 0.5 to about 1.5 mols/liter of the reagent. The solvent can comprise a balance of the reagent. In various non-limiting embodiments, it is also contemplated that all values and ranges of values between and including those values set forth above are expressly contemplated for use herein.

In one additional embodiment, e.g. as related to use of an alcoholic coulometric reagent, the sulfur dioxide or derivative thereof is present in an amount of from about 0.05 to about 1, mols/liter of the reagent, the base is present in an amount of from about 0.5 to about 2.5 or about 0.5 to about 5, mols/liter of the reagent, the hydrohalide donor or hydrogen halide is present in an amount of from about 0.01 to about 2, mols/liter of the reagent, and the sulfonic acid is present in an amount of from about 0.5 to about 1.5 mols/liter of the reagent. The solvent can comprise a balance of the reagent.

In another additional embodiment, the sulfur dioxide or derivative thereof is present in an amount of from about 0.2 to about 1.0, mols/liter of the reagent, the base is present in an amount of from about 1.0 to about 1.7, mols/liter of the reagent, the hydrohalide donor or hydrogen halide is present in an amount of from about 0.1 to about 1.1, mols/liter of the reagent, and the sulfonic acid is present in an amount of from about 0.5 to about 1.5 mols/liter of the reagent. The solvent can comprise a balance of the reagent.

In still a further embodiment, the sulfur dioxide or derivative thereof is present in an amount of about 0.9 mols/liter of the reagent, the first derivative of imidazole is present in an amount of about 1.2, mols/liter of the reagent wherein each of R, $R^1$, and $R^2$ is independently a hydrogen atom or a methyl, ethyl, propyl or butyl group, provided that R, $R^1$, and $R^2$ are not all hydrogen atoms, the hydrohalide of the second derivative of imidazole is present in an amount of about 0.9, mols/liter of the reagent, wherein each of R, $R^1$, and $R^2$ is independently a hydrogen atom or a methyl, ethyl, propyl or butyl group, provided that R, $R^1$, and $R^2$ are not all hydrogen atoms; and the sulfonic acid is present in an amount of from about 0.5 to about 1.5 mols/liter of the reagent. The solvent can comprise a balance of the reagent. In various non-limiting embodiments, it is also contemplated that all values and ranges of values, both whole and fractional, between and including those values set forth above are expressly contemplated for use herein.

In another additional embodiment, e.g. as related to use of an alcoholic volumetric one-component reagent, the sulfur dioxide or derivative thereof is present in an amount of from about 0.01 to about 1, mols/liter of the reagent, the base is present in an amount of from about 0.5 to about 2.5 or about 0.5 to about 5, mols/liter of the reagent, the hydrohalide of the second derivative of imidazole is present in an amount of from about 0.01 to about 2, mols/liter wherein each of R, $R^1$, and $R^2$ is independently a hydrogen atom or a methyl, ethyl, propyl or butyl group, provided that R, $R^1$, and $R^2$ are not all hydrogen atoms or the hydrohalide of the second derivative of imidazole is present in an amount of about 0.3 to about 1.0, mols/liter of the reagent, wherein each of R, $R^1$, and $R^2$ is independently a hydrogen atom or a methyl, ethyl, propyl or butyl group, provided that R, $R^1$, and $R^2$ are not all hydrogen atoms; iodine is present in an amount of from about 0.5 to 5 mols/liter, and the sulfonic acid is present in an amount of from about 0.5 to about 1.5 mols/liter of the reagent. The solvent can comprise a balance of the reagent. In various non-limiting embodiments, it is also contemplated that all values and ranges of values between and including those values set forth above are expressly contemplated for use herein.

Referring specifically to the step of providing the reagent, the reagent may be formed/provided using any order of addition. For example, any total amount or partial amount of any of the aforementioned components may be combined with any total amount or partial amount of any other of the components.

In one embodiment, for example, about 130 g of base is combined with about 130 g of a hydrohalide donor or hydrogen halide and dissolved in solvent. Subsequently, about 8 g of sulfur dioxide or derivative thereof are introduced into the solution.

In yet another example, the reagents can be used in the anode space and/or the cathode space of the coulometric two chamber cell or as universal electrolyte in the single-chamber cell. These reagents of this disclosure can also be used as the solvent component of a one-component reagent or a two-component reagent. For example, if the reagent of this disclosure is used as a solvent, then a one-component reagent or a two-component reagent can be added thereto to titrate the water amount of a sample. If iodine is added to these reagents of this disclosure than the corresponding reagent can be used as a one-component reagent.

In other embodiments, solutions of reagents described herein can either be used as anolyte in a coulometric cell having only one chamber or additionally as catholyte in a coulometric cell having two separated chambers. Furthermore, solutions can also be filled into a volumetric titration cell as solvent component. A water containing sample can be added into a titration cell and titrated by using a commercially available iodine reagent (e.g. one-component or two-component reagent).

In one embodiment, the method includes the step of titrating the sample with the reagent. This is typically described as a volumetric method. In another embodiment, the method includes the step of combining the sample and the reagent such that the sample can be titrated. In this embodiment, the method typically includes the step of providing a source of iodine ($I_2$). The source of iodine may be any known in the art, e.g. solid $I_2$ dissolved in any suitable solvent and/or in any of the aforementioned reagents. In various embodiments, the solution to which the iodine is added may have from about 1 to about 10 weight percent of iodine after its addition. In a coulometric method, the iodine can be generated by anodic oxidation of an iodide such that no additional or external source of iodine may be needed/used. The sample can be titrated to determine the amount of water in the sample by using one of the aforementioned Karl Fischer methods. In various non-limiting embodiments, it is also contemplated that all values and ranges of values, both whole and fractional, between and including those values set forth above are expressly contemplated for use herein.

For example, any necessary iodine can be added via the aforementioned iodine solution or can be generated by anodic oxidation from added iodide. During method, the added or anodically generated iodine is typically reduced to iodide by the reaction with the sulfur dioxide or derivative thereof and water. When there is no more water, free iodine is left over. The iodine excess can be used for indicating the end-point, for example for visual or for photometric indication. It is also possible to indicate the end-point electrochemically, for example bipotentiometrically or biamperometrically.

Volumetric determination can be carried out by introducing the reagent into the titration vessel as a solvent component. Then the sample can be added to the titration vessel such that the water is titrated by introducing an iodine containing one-component reagent or a two-component reagent. Typically, titrations utilizing a one-component reagent that is traditionally a solution of iodine, base and $SO_2$ include providing a solvent in a vessel, adding the sample to the vessel that includes the solvent, and then adding the one-component reagent to the combination of the sample in the vessel and the solvent. The reagent of this disclosure can be used in this titration as a solvent. Titrations utilizing a two-component reagent typically include providing, e.g. a base and $SO_2$ containing solvent like the reagent of this disclosure in a vessel. Then a sample is typically added to the vessel. Finally, the two-component reagent is then typically added to the vessel such that the titration reactions can begin.

The reagent of this disclosure can also be used as a one-component titrating reagent in a volumetric titration. To use it as such it is necessary to add 1-10 weight % of iodine to the reagent.

Coulometric determination can be carried out, for example, by introducing the components of the reagent into a coulometric cell, such as a divided cell and then, according to the cell construction, adding the sample and electrolyzing, by switching on the electrolysis current, until the water present in the sample has been converted.

Prior to the determination of an amount of water in the sample, water contained in the aprotic solvent can be removed in a blank titration (e.g. by pre-electrolysis in the case of a coulometric determination). Typically, in a coulometric titration, the aforementioned first derivative of imidazole is combined with the hydrohalide of the second derivative of imidazole. In various embodiments, e.g. if the coulometric cell requires a reagent having a conductivity of from about 5 to about 20 mS/cm, it may be necessary to add additional supporting electrolytes. These may be soluble inorganic salts such as tetrabutylammonium chloride, imidazolium hydrogen bromide, etc.

To indicate the end-point, both in volumetric analysis and in coulometric titration, it is contemplated that bipotentiometric or biamperometric indication may be utilized. For example, the reagent and/or sample may be spiked with one or more known compounds that have known reproducible end-points. These may be chosen by those of skill in the art. Moreover, one or more buffers may be utilized. In still other embodiments, the method may include or be free of one or more of the compounds, method steps, etc. as set forth in U.S. Pat. No. 5,401,662, which is expressly incorporated herein by reference in its entirety in various non-limiting embodiments.

In various embodiments, the method of this disclosure produces start drifts of less than about 15, 14, 13, 12, 11, 10, 9, 8, 7, 6, 5, 4, 3, 2, or 1, µg/min, as determined by one of skill in the art using any of the aforementioned titrating methods. In various non-limiting embodiments, it is also contemplated that all values and ranges of values, both whole and fractional, between and including those values set forth above are expressly contemplated for use herein.

In additional embodiments of this disclosure, it is contemplated that the reagent may be free of the hydrogen halide donor. In other embodiments, it is contemplated that the reagent may be as follows wherein all numbers are in approximate amounts of moles/liter of reagent.

| Component | Coulometric Alcohol Free | Coulometric Alcoholic | Volumetric Alcohol Free or Alcoholic (One Component Reagent) |
|---|---|---|---|
| Sulfur Dioxide or Derivative Thereof | 0.01 to 5 Or 0.2 to 0.3 | 0.01 to 5 Or 0.6 to 0.9 | 0.01 to 5 Or 0.4 to 0.9 |
| Base | 0.1 to 10 Or 1 to 1.8 | 0.1 to 10 Or 1 to 1.8 | 0.1 to 10 Or 1.5 to 3 |
| Hydrogen Halide or Hydrogen Halide Donor | 0.01 to 3 Or 0.15 to 0.3 | 0.01 to 3 Or 0.3 to 0.9 | 0 to 3 Or 0 to 1 |
| Hydrogen Halide Acceptor | 0.0 to 10 Or 0 to 1 | 0.0 to 10 Or 0 to 2 | 0.0 to 10 Or 0 to 2 |
| Free Iodine | — | — | 0.1 to 2 Or 0.1 to 1 |
| Sulfonic Acid | 0.5 to 1.5 | 0.5 to 1.5 | 0.5 to 1.5 |

In various non-limiting embodiments, it is also contemplated that all values and ranges of values, both whole and fractional, between and including those values set forth above are expressly contemplated for use herein.

In other embodiments, the reagent includes sulphur dioxide, iodide (a hydroiodide of imidazole or one of the aforementioned derivatives thereof of it), one of the aforementioned imidazole derivatives, or mixtures thereof with one or more amines, such as those described above. In related embodiments, the solvent is an anhydrous aprotic solvent, such as propylene carbonate (PC) or acetonitrile (or mixtures of different aprotic solvents such as ethers, esters, halo-hydrocarbon, acid amide, and combinations thereof.

In various embodiments, it has been found that using a mixture of sulfonic with acetonitrile as solvent allows for it to be possible to prepare Karl Fischer reagents which react in the same or similar way as the alcohol containing reagents. For example, some reagents of this disclosure show the same stoichiometric reaction 1:1, H2O:I2, as in many alcoholic solutions. In addition, some reagents show a series of additional advantages. For example, methane sulfonic acid increases significantly the conductivity of Karl Fischer reagents made from protic and aprotic solvents (see example 3). High conductivity values are extremely important especially in coulometric Karl Fischer methodology. Thus, Karl Fischer reagents based on methane sulfonic acid are outstandingly suitable for the coulometric determination of water. Since sulfonic acids are good proton donors, reagents with sulfonic acids can be used as a universal anolyte reagent in a titration cell without a diaphragm and also catholyte in a titration cell with diaphragm. In various embodiments, the reagent is prepared by dissolving a base (e.g. imidazole, 1-ethylimidazole, 2-ethylimidazole) in acetonitrile. Further solvents like propylene carbonate or acid amides like 2-pyrrolidone can also be added. Imidazolium hydroiodide or a hydroiodide of a substituted imidazolium derivate or another source of hydrogen iodide can added along with the sulfonic acid. Finally, sulphur dioxide can be passed into the solution.

In one embodiment, a one component volumetric reagent is prepared. For example, the reagent may be prepared by dissolving a base (e.g. imidazole, 1-ethylimidazole) in acetonitrile. Further solvents like propylene carbonate or acid amides like 2-pyrrolidone can also be added. Imidazolium hydroiodide or a hydroiodide of a substituted imidazolium derivate or another source of hydrogen iodide can be added along with the sulfonic acid. Sulphur dioxide can be passed into the solution. Finally, iodine is added into the solution.

In another embodiment, a two component volumetric reagent is prepared. For example, a titrant may be prepared by dissolving iodine in acetonitrile. Further solvents like propylene carbonate or acid amides like 2-pyrrolidone can also be added. In addition, a solvent may be prepared by dissolving a base (e.g. imidazole, 1-ethylimidazole) in acetonitrile. Further solvents like propylene carbonate or acid amides like 2-pyrrolidone can also be added. Hydrogen iodide or imidazolium hydroiodide or a hydroiodide of a substituted imidazolium derivate can also be added along with sulfonic acid. Finally, Sulphur dioxide is passed into the solution.

It is also contemplated that acetonitrile can also be used in admixture with other solvents such as acid amides, chloroform, xylene, alcohols or alcoholic reagents, so that the solvent combination of acetonitrile with alcohols and/or other solvents can be matched to the requirements of the sample.

EXAMPLES

A series of titrations are performed according to this disclosure and as comparative examples.

Example 1

A first example involves titration of a water standard as shown below using a Metrohm 852 Titrando apparatus. This example focused on stabilizing KF stoichiometry of a protic KF reagent and shows that without methanesulfonic acid, the error is unacceptably high (~86%). However, once methanesulfonic acid is utilized, the error drops to approximately zero.

| Protic KF reagent (1) | [g] |
|---|---|
| Methanol | 663 |
| Butylaminoethanol | 56 |
| 2-Ethylimidazol | 107 |
| 2-Ethylimidazol hydroiodide | 67 |
| Sulfur dioxide | 67 |

| Protic KF reagent (1) without Methanesulfonic acid | Stoichiometry 1:1 | |
|---|---|---|
| Titration of Water Standard | 1004 ppm | |
| Result | 140 ppm | |
| Error | −86% | no |

| Protic KF reagent (1) + 10 g Methanesulfonic acid | Stoichiometry 1:1 | |
|---|---|---|
| Titration of Water Standard | 1004 ppm | |
| Result | 1000 ppm | |
| Error | 0% | yes |

Example 2

A second example involves titration of a water standard as shown below using a Metrohm 852 Titrando apparatus. This example focused on stabilizing KF stoichiometry of an aprotic KF reagent and shows that without methanesulfonic acid, the error is approximately 7%. However, once methanesulfonic acid is utilized, the error drops to approximately zero.

| Aprotic KF reagent (2) | [g] |
|---|---|
| Acetonitrile | 570 |
| 1-Ethylimidazol | 263 |
| 1-Ethylimidazol hydroiodide | 28 |
| Sulfur dioxide | 22 |

| Aprotic KF reagent (2) without Methanesulfonic acid | Stoichiometry 1:1 | |
|---|---|---|
| Titration of Water Standard | 1004 ppm | |
| Result | 930 ppm | |
| Error | −7% | no |

| Aprotic KF reagent (2) + 15 g Methanesulfonic acid | Stoichiometry 1:1 | |
|---|---|---|
| Titration of Water Standard | 1004 ppm | |
| Result | 999 ppm | |
| Error | 0% | yes |

Example 3

A third example involves the measurement of the conductivity of protic (e.g. methanol) and aprotic solvents (e.g. acetonitrile) with and without methanesulfonic acid. The conductivity can be significantly increased by a factor of 2500-8000 when methanesulfonic acid is added.

| | Conductivity mS/cm | Factor |
|---|---|---|
| Protic solvent | | |
| 40 mL Methanol | 0.007 | 0 |
| 20 mL Methanol + 20 mL Methanesulfonic acid | 56 | 8000 |

| | Conductivity mS/cm | Factor |
|---|---|---|
| Aprotic solvent | | |
| 40 mL Acetonitrile | 0.002 | 0 |
| 20 mL Acetonitrile + 20 mL Methanesulfonic acid | 5 | 2500 |

In various non-limiting embodiments, it is contemplated that any terminology of alcohol-free solvent, solution, and/or reagent may be substituted with aprotic solvent, solution, and/or reagent. Similarly, in various non-limiting embodiments, it is contemplated that any terminology of alcoholic solvent, solution, and/or reagent may be substituted with protic solvent, solution, and/or reagent.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A method for determining an amount of water in a sample, said method comprising the steps of:
   A. providing a reagent comprising:
      (1) sulfur dioxide or a derivative thereof;
      (2) a base;
      (3) an optional hydrogen halide or hydrogen halide donor;
      (4) a solvent; and
      (5) a sulfonic acid; and
   B. titrating the sample with the reagent.

2. The method of claim 1 wherein the sulfonic acid is an alkyl or aryl sulfonic acid or combinations thereof.

3. The method of claim 1 wherein the sulfonic acid is chosen from methane sulfonic acid, ethane sulfonic acid, toluene sulfonic acid, alkyl benzene sulfonic acids, and combinations thereof.

4. The method of claim 1 wherein the sulfonic acid is methane sulfonic acid.

5. The method of claim 1 wherein the solvent comprises an alcohol, a nitrile solvent, or combinations thereof.

6. The method of claim 1 wherein the solvent is a nitrile solvent.

7. The method of claim 1 wherein the solvent is chosen from acetonitrile, propionitrile, and combinations thereof.

8. The method of claim 1 wherein the solvent is acetonitrile.

9. The method of claim 1 wherein the solvent comprises an alcohol chosen from methanol, ethanol, propanol, 1-methoxypropan-2-ol, mono- and di-ethylene glycol monoalkyl ethers, and combinations thereof.

10. The method of claim 1 wherein the base is imidazole and/or a derivative thereof.

11. The method of claim 10 wherein the imidazole derivative has the following structure:

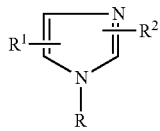

wherein each of R, $R^1$ and $R^2$, is independently a hydrogen atom, a phenyl group, substituted phenyl group, a first hydrocarbyl group having from 1 to 6 carbon atoms, or a second hydrocarbyl group having 1 to 6 carbon atoms interrupted in at least one position with a heteroatom, provided that R, $R^1$, and $R^2$ are not all hydrogen atoms.

12. The method of claim 1 wherein the hydrogen halide donor is a hydrohalide of imidazole or a hydrohalide of a second derivative of imidazole wherein the second derivative of imidazole has the following structure:

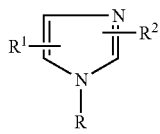

wherein each of R, $R^1$, and $R^2$ is independently a hydrogen atom, a phenyl group, a substituted phenyl group, a first hydrocarbyl group having from 1 to 6 carbon atoms, or a second hydrocarbyl group having 1 to 6 carbon atoms interrupted in at least one position with a heteroatom.

13. The method of claim 1 wherein the sulfur dioxide or derivative thereof is present in an amount of from about 0.01 to about 5, mols/liter of the reagent, the base is present in an amount of from about 0.1 to about 10, mols/liter of the reagent, and the sulfonic acid is present in an amount of from about 0.5 to about 1.5 mols/liter of the reagent.

14. A method for determining an amount of water in a sample, said method comprising the steps of:
   A. providing a reagent comprising:
      (1) sulfur dioxide or a derivative thereof;
      (2) a base;
      (3) an optional hydrogen halide or hydrogen halide donor;
      (4) a solvent; and
      (5) a sulfonic acid; and
   B. combining the sample with the reagent; and
   C. adding a source of iodine to the sample and/or the reagent.

15. The method of claim 14 wherein the sulfonic acid is an alkyl or aryl sulfonic acid or combinations thereof.

16. The method of claim 14 wherein the sulfonic acid is chosen from methane sulfonic acid, ethane sulfonic acid, toluene sulfonic acid, alkyl benzene sulfonic acids, and combinations thereof.

17. The method of claim 14 wherein the sulfonic acid is methane sulfonic acid.

18. The method claim 14 wherein the solvent comprises an alcohol, a nitrile solvent, or combinations thereof.

19. The method of claim 14 wherein the sulfur dioxide or derivative thereof is present in an amount of from about 0.01 to about 5, mols/liter of the reagent, the base is present in an amount of from about 0.1 to about 10, mols/liter of the reagent, and the sulfonic acid is present in an amount of from about 0.5 to about 1.5 mols/liter of the reagent.

20. A reagent for Karl-Fischer titrations, said reagent consisting essentially of:
   (1) sulfur dioxide or a derivative thereof;
   (2) imidazole and/or a derivative thereof;
   (3) an optional hydrogen halide or hydrogen halide donor;
   (4) acetonitrile;
   (5) methane sulfonic acid; and
   (6) methanol and/or ethanol and/or 1-methoxy-2-propanol and/or propylene glycol.

\* \* \* \* \*